US00RE46212E

(19) United States
(12) Reissued Patent
Ebert

(10) Patent Number: US RE46,212 E
(45) Date of Reissued Patent: Nov. 22, 2016

(54) EDGE PROTECTOR SYSTEMS FOR CATHODE PLATES AND METHODS OF MAKING SAME

(71) Applicant: William A. Ebert, Tuscon, AZ (US)

(72) Inventor: William A. Ebert, Tuscon, AZ (US)

(21) Appl. No.: 14/121,368

(22) Filed: Aug. 26, 2014

Related U.S. Patent Documents

Reissue of:
(64) Patent No.: 6,746,581
Issued: Jun. 8, 2004
Appl. No.: 10/278,269
Filed: Oct. 22, 2002

(51) Int. Cl.
*C25C 7/02* (2006.01)
*C25C 7/00* (2006.01)

(52) U.S. Cl.
CPC .. *C25C 7/02* (2013.01); *C25C 7/00* (2013.01)

(58) Field of Classification Search
None
See application file for complete search history.

(56) References Cited

U.S. PATENT DOCUMENTS

| | | | | |
|---|---|---|---|---|
| 4,207,147 | A * | 6/1980 | Babin | 204/281 |
| 4,406,769 | A | 9/1983 | Berger | |
| 4,670,124 | A | 6/1987 | Bartsch et al. | |
| 4,776,928 | A | 10/1988 | Perlich | |
| 5,368,714 | A | 11/1994 | Tanaka et al. | |
| 5,470,450 | A | 11/1995 | Tanaka et al. | |
| 5,549,801 | A | 8/1996 | Perlich et al. | |
| 6,017,429 | A | 1/2000 | Persson | |
| 6,193,862 | B1 | 2/2001 | Cutmore et al. | |
| 6,231,730 | B1 | 5/2001 | Davis et al. | |
| 6,264,808 | B1 | 7/2001 | Marttila | |
| 6,274,012 | B1 * | 8/2001 | Santoyo | 204/279 |
| 6,312,573 | B1 | 11/2001 | Dwyer et al. | |
| 6,551,475 | B2 | 4/2003 | Dwyer | |
| 6,702,933 | B2 | 3/2004 | Alexander | |
| 6,951,600 | B2 | 10/2005 | Santoyo | |

FOREIGN PATENT DOCUMENTS

| | | |
|---|---|---|
| EP | 0202018 | 11/1986 |
| JP | 63033590 | 2/1988 |
| WO | 9741280 | 11/1997 |

OTHER PUBLICATIONS

Wernick, "Devices for Controlling the Distribution of Electrodeposits," Electrodepositors' Technical Society, vol. XIX, 1943-44, pp. 35-48.
Marley Plastics Brochure, "Cathode Edge-Strip System the market leader".

* cited by examiner

*Primary Examiner* — Terrence Till
(74) *Attorney, Agent, or Firm* — R. Michael West

(57) ABSTRACT

Cathode plate edge protector systems formed by secondary and tertiary molding processes, in which fluid plastic is molded around and/or introduced into previously manufactured plastic edge protectors. A U-shaped edge protector system is formed by bevel-cutting abutting ends of edge protector strips, securing the strips in the desired configuration a molding jig, and molding corner pieces around the abutting ends. The system is then removed from the jig and slip-installed over the two sides and the bottom edge of a cathode plate. In an optional tertiary molding process, fluid plastic may be introduced into the remaining void between the edge protector system and the cathode plate. Another edge protector system is formed by mounting edge protector strips on opposing side edges of a cathode plate, damming the open ends, and introducing fluid plastic in the contained voids between the strips and the cathode plate.

20 Claims, 5 Drawing Sheets

EDGE PROTECTOR SYSTEMS FOR CATHODE PLATES AND METHODS OF MAKING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The invention relates generally to non-metallic protective coverings for the edges of cathode plates used in electrowinning processes. More specifically, the invention pertains to cathode plate edge protector systems formed by secondary and tertiary molding processes, in which fluid plastic is molded around and/or injected into previously molded plastic edge protectors.

2. Description of the Prior Art

The two processing methods used for producing copper are: pyrometallurgy, or smelting, and hydrometallurical leaching. The present invention pertains to the latter method, in which copper bearing ore is pulverized and placed on a leach pad. A weak solution of sulfuric acid is sprayed onto the upper surface of the pulverized ore. The acid solution percolates through the ore, dissolving the acid-soluble copper. The solution is collected in a pond beneath the leach pad.

In the next step, the copper-bearing solution is pumped from the pond to a solvent extraction facility. At this facility, organic chemicals are mixed with the solution, separating the copper into a more concentrated solution. This concentrate is then mixed with sulfuric acid, forming an electrolyte solution.

The final step is the electrowinning process, an electrolytic method used to remove heavy metal ions from concentrated solutions. The copper electrolyte is pumped from the extraction facility into a steel tank at the electrowinning facility. Rows containing alternating cathode and anode plates extend throughout the volume of the tank. The cathode plates are made from stainless steel and the anode plates are made from lead. The plates are vertically suspended, so as to be substantially immersed in the copper electrolyte. The upper ends of the cathodes and the anodes are welded to horizontal hanger bars, which overlay respective electrical buss lines. The buss lines are interconnected to a source of low voltage, high current, DC. The copper ions are reduced through the electolytic process, and deposited as a layers of copper covering the cathode plates. After a week, or so, the cathode plates are removed from the electrolyte and an electroplated copper sheet is stripped from each side of the stainless steel cathode plates.

During this electrowinning process, the copper deposits along the edges of the cathode grow faster and sometimes in a more irregular fashion, that on the planar portions. This causes problems in removal of the copper sheets, as the edge deposited copper is thicker and of varying shape. The prior art teaches the use of non-conductive edge protectors, which extend along the side edges and the bottom edge of the cathode. The edge protectors cover the edges and a small adjacent strip of the planar portion of the cathode. In this way, no copper is deposited onto the edges of the cathode, and a clean line is presented by the inner edge of the edge protector for easy removal of the copper sheet.

Many different designs for these edge protectors have been developed. For example, U.S. Pat. No. 5,690,798, granted to Alexander et al., shows a corner protector for an electrowinning electrode. In this arrangement, a corner protector is located at each corner of the electrode, covering the region where each side edge strip and the bottom edge strip meet in abutting relation. Each corner protector has a vertical channel for receiving the lower end of a side edge strip, a horizontal channel for receiving the end of the bottom edge strip, and a cutout for receiving the corner of the cathode element.

However, the electrolytic process produces heat and expansive forces which compromise the integrity and useful life of prior art edge protectors. Adhesives fail, leaks develop, and deposits eventually form inside the cracks and the cavities of the prior art edge protector systems. When the deposits form in these regions, the edge protectors bulge outwardly and allow further intrusions of the electrolyte. Then, the sheets of deposited copper are difficult to remove, or are damaged during removal, and the cathode plate requires servicing before it can be used again.

Therefore, the need exists for a cathode edge protector system which does not rely upon adhesives, retainer strips, or other mechanical connectors, for attachment to the cathode.

The need exists for a cathode edge protector system incorporating a corner protector molded in situ on the end of one or more edge strips.

The need also exists for a cathode edge protector system which contains no external cracks or defects, or any internal voids, into which electrolyte can seep or intrude.

The need further exists for a cathode plate edge protector system in which edge strips can be preliminarily molded into any desired shape, mounted onto an edge of a cathode plate, and subsequently filled with fluid plastic for structural integration with the cathode plate.

SUMMARY OF THE INVENTION

The cathode plate edge protector systems of the present invention are formed by carrying out secondary and tertiary molding processes in conjunction with previously molded or extruded plastic edge protector strips. The first embodiment, a U-shaped edge protector system, is formed by first bevel-cutting the four abutting ends of three edge strips. The strips are then installed into a molding jig to form a U-shaped assembly. The molding jig includes right-angle cavities surrounding the two corners of the assembly. Lastly, fluid plastic is introduced into the cavities, molding plastic corner pieces around the abutting ends of the edge strips, and forming a unitary structure.

The edge protector system is removed from the jig and prepared for installation over the two side edges and the bottom edge of a cathode plate. The cathode plate includes a plurality of plate apertures arranged in spaced relation along its opposing first and second side edges. First and second plastic retainer strips, including a plurality of liked-spaced registration pins on their undersides, are installed along the side edges with the pins fitted into respective apertures.

A second edge protector system is formed by mounting an edge protector strip on the side edge a cathode plate, without a retainer strip. After damming the open ends, a fluid curable into a hardened body is introduced into the contained void between the edge strip and the side edge of the cathode plate. The process is repeated for the opposing edge.

A third edge protector system incorporates aspects of the first system and adds a tertiary molding process. The U-shaped edge protector system of the first system is formed, but it is merely slip-installed onto the cathode plate without using the retainer strips. Then, in a third tertiary molding process, fluid plastic is introduced into the contained void between the edge protector system and the cathode plate, filling the void within the edge protector system and the apertures in the cathode plate. A permanent and integrated structure between the edge protector system and the cathode plate is thereby formed.

DETAILED DESCRIPTION OF THE PREFERRED EMBODIMENT

Figure 1:
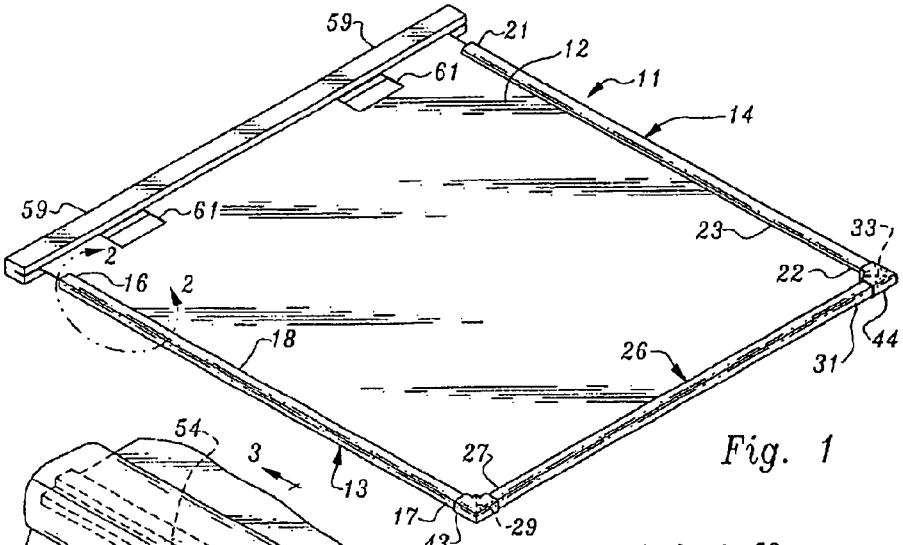
FIG. 1 is a perspective view of a first edge protector system, mounted on a cathode plate with a hanger extending along its upper edge.

Turning now to the drawings, and in particular FIG. 1, a U-shaped edge protector system 11 for a cathode plate 12 is shown. Edge protector system 11 comprises a first side edge strip 13 and a second side edge strip 14, preferably molded or extruded from a plastic material. First side edge strip 13 has an upper end 16 and a lower end 17, and an inner, open side portion 18 extending therebetween. Lower end 17 includes a bevel termination 19. Similarly, second edge strip 14 has an upper end 21, a lower end 22, and an inner, open side portion 23 extending between ends 21 and 22. The lower end 22 of second edge strip 14 is also provided with a bevel termination 24.

Also provided is a bottom edge strip 26, having [an] *a* first end 27 with a bevel termination 28. Bevel termination 28 is adapted for mating engagement with bevel termination 19 of the first side edge strip 13, forming a first juncture 29. Bottom edge strip 26 also includes a second end 31 with a bevel termination 32 adapted for mating engagement with bevel termination 24 of the second side edge strip 14. A second juncture 33 is thereby formed, as shown in FIG. 1. Bottom edge strip 26 also has an inner, open side portion 34, extending between the first end 27 and the second end 31.

Figures 6, 7, 8, 9:
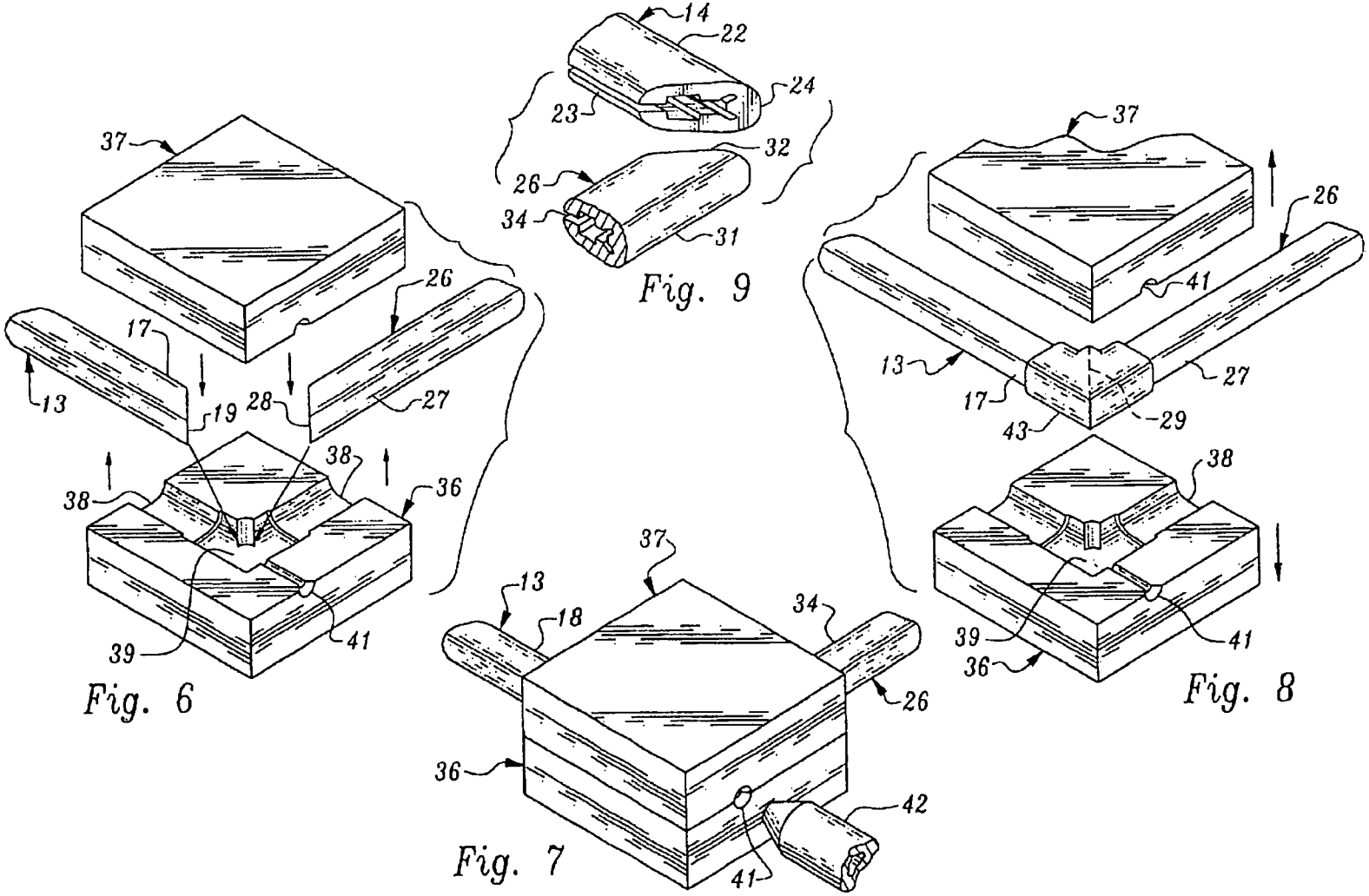
FIG. 6 is an exploded perspective view, showing the first step of a corner piece molding process, with a side edge protector strip and a bottom edge protector strip being installed in the lower half mold with their beveled edges arranged in abutting relation.
FIG. 7 is a perspective view showing the second step of a corner piece molding process, the mold halves being closed upon the protector strips and the fluid plastic injection nozzle being introduced to an injection passageway.
FIG. 8 is a perspective view showing the third step of a corner piece molding process, the mold halves being separated and the unitary edge strips and the molded corner being removed from the lower half mold;.
FIG. 9 is a fragmentary, exploded, perspective view showing the beveled ends of the second side edge strip and the second end of the bottom edge strip, prior to installation into a lower mold half for forming a second molded corner.

To complete formation of the U-shaped edge protector system 11, first side edge strip 13 and bottom edge strip 26 are placed within a lower corner mold 36 with their respective bevel terminations in aligned, abutting relation. Then, as shown in FIG. 7, an upper corner mold 37 is lowered over the lower corner mold and the captive edge strips, and is clamped securely thereon. Both the upper and the lower corner molds include recesses 38 to accommodate respective portions of the edge strips, and they also include a corner cavity 39 surrounding the ends of the edge strips and the first juncture 29. A passageway 41 extends through the interface of both molds, allowing the introduction of a fluid which is curable into a hardened form. Preferably, this is a plastic material, identical to the material previously used to mold or extrude the side and bottom edge strips. A plastic injection nozzle 42 is inserted into passageway 41, and the fluid plastic is introduced into passageway, entirely filling the corner cavity 39.

It should be noted that while an injection molding process is primarily referred to herein for the molding and formation of the fluid plastic, other equivalent processes may be used.

For example, if the plastic material is made less viscous through the use of additives or elevated temperatures, the fluid plastic may be poured or introduced under low pressures into the various cavities and molds described herein. This approach may be desirable for safety reasons, as well as for ease and speed of production. Thus, the disclosure herein contemplates that the different molding processes may be carried out by injection molding under relatively high pressure, or it may be carried out by pouring the fluid material or introducing it into the edge strips or mold cavities under low pressure.

After a period of time has passed, the introduced fluid material cures into a hardened form, and the upper corner mold 37 may be removed. When the first side edge strip and the bottom edge strip 26 are removed from the lower corner mold, it is evident that a first molded corner piece 43 has been molded over the first juncture 29 (See, FIG. 8). This secondary molding process structurally integrates the previously molded edge strips through the use of a corner piece molded in situ over the mating juncture of the two edge strips. An identical secondary molding process is performed at the other corner of the system, where second side edge strip 14 conjoins with the second end 31 of bottom edge strip 26. (See, FIG. 9). A second molded corner piece 44 is molded over the juncture 33, and the major components of the U-shaped edge protection system 11 have been formed.

Figure 5:
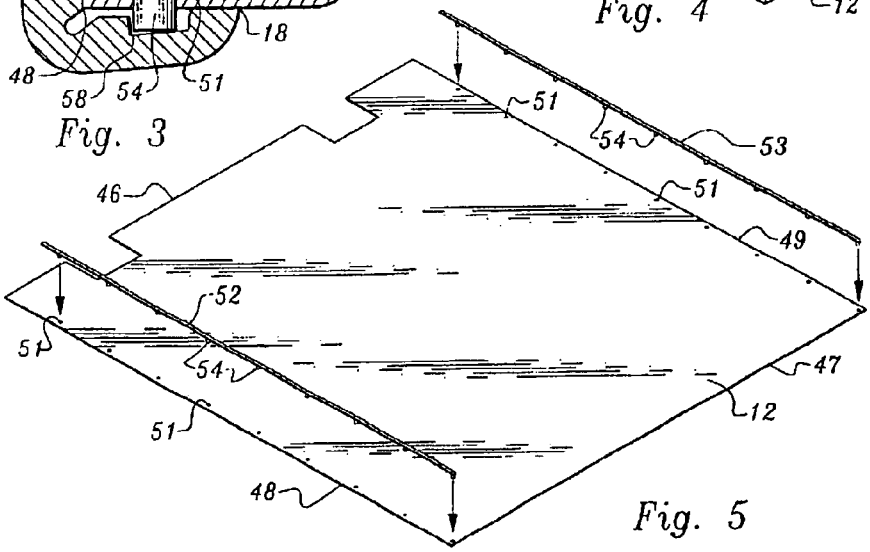
FIG. 5 is a perspective view of a cathode plate, showing the installation of retainer strips with their registration pins aligned for insertion into respective apertures in the cathode plate.

Attention will now be directed to the details of the cathode plate 12, onto which the edge protection system 11 is installed. The cathode plate 12 includes a top edge 46, a bottom edge 47, and first side edge 48 and second side edge 49 extending therebetween. Side edges 48 and 49 include a plurality of plate apertures 51, arranged in spaced relation substantially along their full extent. A first retainer strip 52 and a second retainer strip 53 are provided for installation, respectively, over first side edge 48 and second side edge 49. Each retainer strip includes a plurality of registration pins 54, depending from their undersides. The registration pins 54 are arranged in spaced relation, for snug insertion into respective plate apertures 51. In that manner, retainer strips 52 and 53 are installed onto cathode plate 12. (See, FIG. 5).

To complete the installation of edge protection system 11 onto cathode plate 12, the open side portion 18 of the first side edge strip 13, and the open side portion 23 of the second edge said second side edge strip 14, are respectively slip-installed over the first retainer strip 52 and the second retainer strip 53, until the bottom edge of cathode plate is inserted into the open side portion 34 of the bottom edge strip 26. (See, FIGS. 1 and 10).

Figure 2:
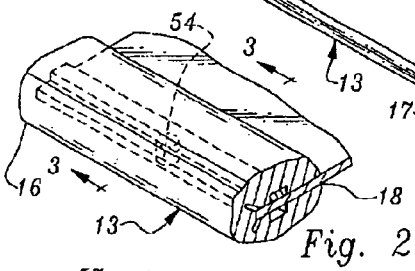
FIG. 2 is a fragmentary, cross-sectional, detail inset, taken on the broken line 2-2 in FIG. 1, showing the retainer strip and the covered portion of the cathode plate in broken line.
Figure 3:
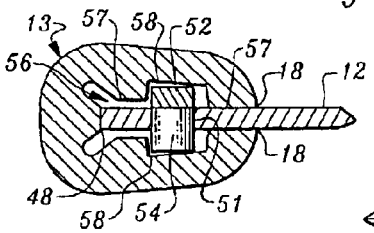
FIG. 3 is a cross-sectional view taken on the line 3-3 in FIG. 2.
Figure 4:
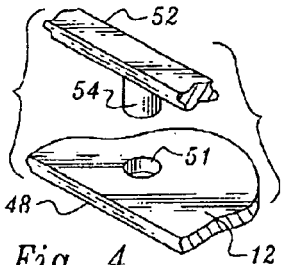
FIG. 4 is a fragmentary, exploded view of a cathode plate and a retainer strip, showing the plate aperture and the registration pin.

As is shown in FIGS. 2 and 3, the open side portions of the edge strips include an inner cavity 56 to accommodate both the edges of the cathode plate and the retainer strips mounted thereon. Inner cavity 56 includes a plate recess 57 sized and configured to receive said side edge of said cathode plate. Cavity 56 also includes a strip recess 58, having upper portion and lower portions in communication with the plate recess 57. Each retainer strip is housed within the upper portion of the strip recess 58. It should be noted that the plate apertures 51 lie within the portion of the plate recess 57 which lies between the upper and lower portions of the strip recess 58. Thus, the registration pins 54 extend downwardly from the retainer strips, pass through the plate apertures 51, and enter the lower portion of the strip recess 58. (See, FIG. 3). In this manner, confinement of the retainer strips 52 and 53 and their registration pins 54 within the strip recesses 58 of the side edge strips, coupled with the registration pins 54 passing through the plate apertures 51, ensure that the edge strips and the cathode plate 12 are securely locked together, particularly against lateral movement.

Figures 10, 11, 12, 13:
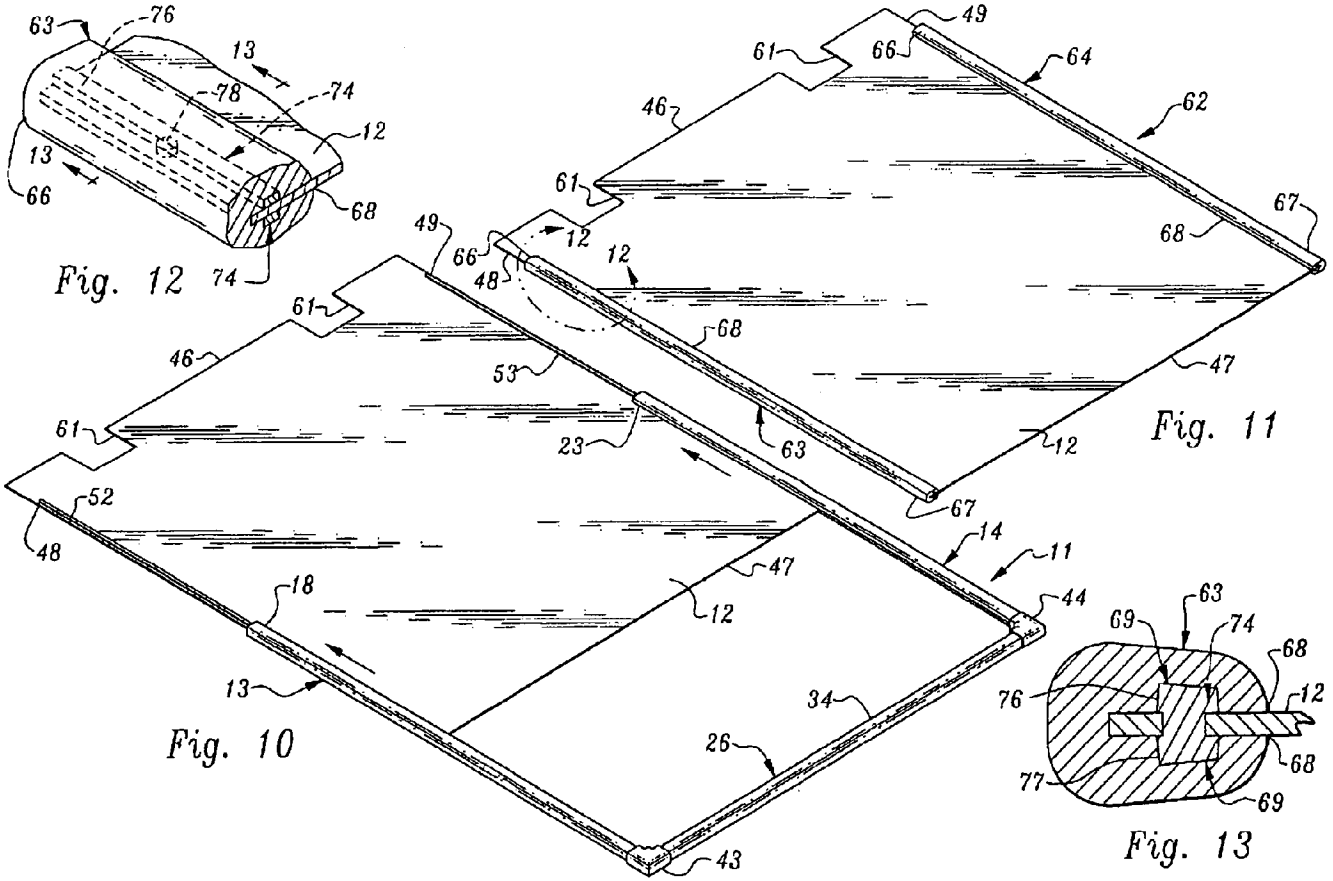
FIG. 10 is a perspective view of a cathode plate fitted with the retainer strips, the first edge protector system in the process of being slip-installed over the side edges.
FIG. 11 is a perspective view of a cathode plate fitted with a second embodiment of an edge protector system.
FIG. 12 is a fragmentary, cross-sectional detail inset taken on the broken line 12-12 in FIG. 11, showing a molded locking body and the covered portion of the cathode plate in broken line.
FIG. 13 is a cross-sectional view taken on the line 13-13 in FIG. 12.

As shown in FIG. 1, a hanger bar 59 extends across the upper edge 46 of the cathode plate 12. The hanger bar is typically welded to the cathode plate, to provide a secure means of suspending the plate within the electrolyte. The hanger bar also lies upon electrical buss lines (not shown), to interconnect the cathode with the power supply. To facilitate periodic removal of the cathode plate from the electrolyte for copper harvesting, two hook holes 61 are provided in the upper end of the plate 12. Because the hanger bar 59 closes off the upper side of the hook holes, the hooks removing the cathode plate actually lift against the hanger bar Another embodiment of an edge protector system 62 is shown in FIG. 11. This embodiment provides protection only for the side edges of a cathode plate 12. Edge protector system 62 includes a first side edge strip 63 and a second side edge strip 64. Both strips 63 and 64 are identical, having an upper end 66, a lower end 67, and an inner, open side portion 68 extending therebetween. Open side portion 68 includes an inner cavity 69 having a volume.

Figure 14:
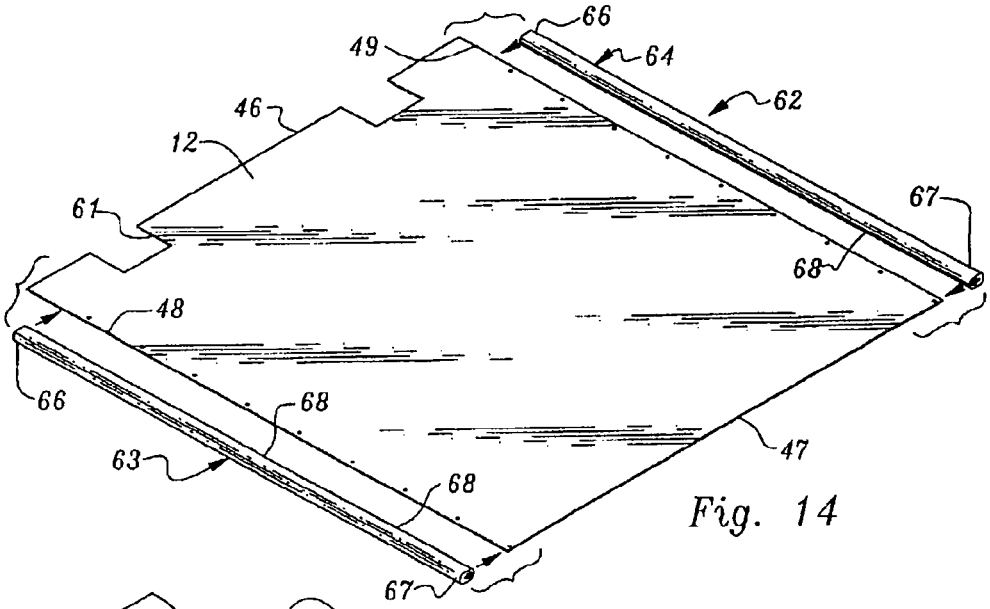
FIG. 14 is a perspective view of the first step of a locking body molding process, the cathode plate being fitted with the pair of side edge protector strips.
Figure 15:
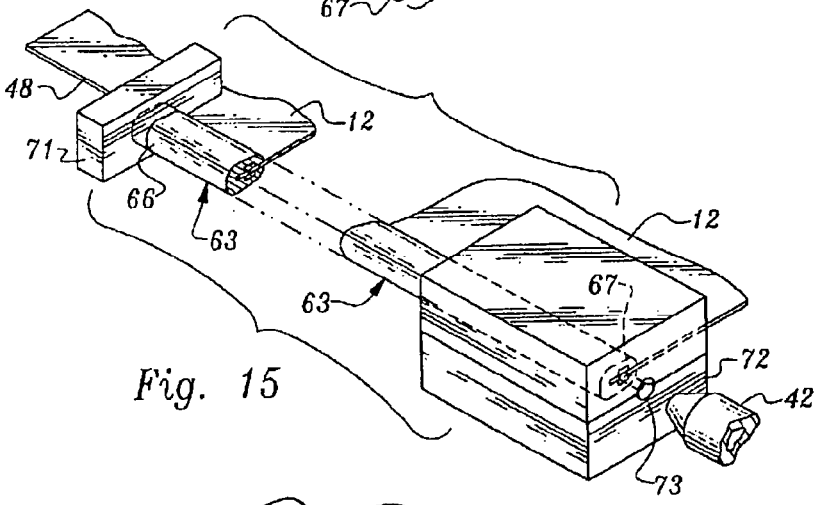
FIG. 15 is a fragmentary, perspective view of the second step of the molding process of FIG. 14, showing the bottom end injection mold forms and the upper end dam.
Figure 16:
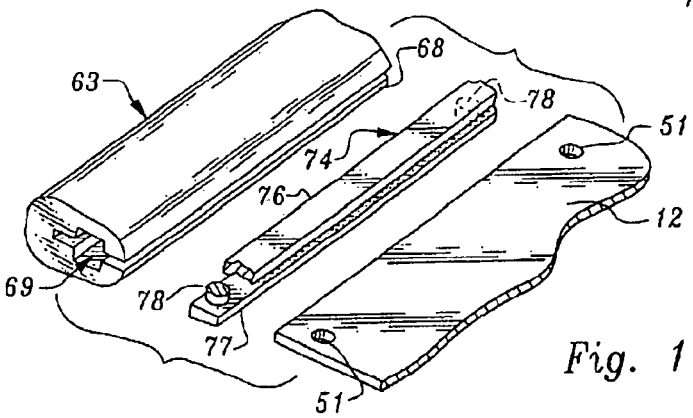
FIG. 16 is a fragmentary, perspective view of a side edge protector strip, showing a locking body which is molded within the side edge protector strip, and the cathode plate about which and through which the locking body is molded.

The cathode plate 12 used in connection with edge protector system 62 is identical to that previously described, so the same numerical designations will be employed for the sake of simplicity. Cathode plate 12 has a top edge 46, a bottom edge 47, and a first side edge 48 and a second side edge 49 extending therebetween. The first and second side edges include a plurality of plate apertures 51 extending through the cathode plate. The apertures 51 are arranged in spaced relation along the cathode plate edges, as shown in FIGS. 14 and 16.

In a first step in assembling the system 62, the first side edge strip 63 is installed over the first side edge 48 of the cathode plate 12. (See, FIG. 14). Preferably, after this step is completed, the cathode plate and the strip 63 are held in place securely by means of a jig or other suitable clamping apparatus. The first side edge 48 fills only a portion of the volume of the inner cavity 69 within the first side edge strip. It should be noted, in addition, that the open side portion 68 of the first side edge strip 63 encloses the plate apertures 51 which extend along the first side edge 48.

At this juncture, a dam 71 is installed over the upper end 66 of side edge strip 63. This [darn] *dam* seals off the otherwise open end of the inner cavity 69. At the lower end 67 of side edge strip 63, an edge strip injection mold 72 is installed over portions of the strip 63 and the cathode plate 12. Injection mold 72 is of split block construction for easy installation and removal. Mold 72 also includes an injection port 73, having an inner passageway in communication with the inner cavity 69. The previously described injection nozzle 42 is adapted for insertion into port 73, for delivery of a fluid curable into a hardened form, into inner cavity 69. Preferably, this fluid is an injection molded plastic, of the same material used in the previous manufacture of the side edge strips 63 and 64.

Upon injection or introduction of the fluid into the inner cavity 69, the remaining unfilled portion of the inner cavity 69, primarily above and below the side edge of the cathode plate and within the plurality of plate apertures, is filled with fluid. When this fluid cures into a hardened form, a locking body 74 is formed. The configuration of the locking body 74 is particularly evident in FIG. 16. Locking body 74 includes an upper strip 76, a lower strip 77, and cylindrical pins 78 extending therebetween. With the cylindrical pins 78 passing through the plate apertures, and the upper and lower strips filling the remainder of the inner cavity above and below the edge of the cathode plate, the side edge strip 63 and the cathode plate 12 are securely and permanently joined together. Then, upon removal of the [darn] *dam* 71 and the strip injection mold 72, the identical process is repeated for mounting and securing remaining side edge strip 64 to the cathode plate 12.

Figure 17:
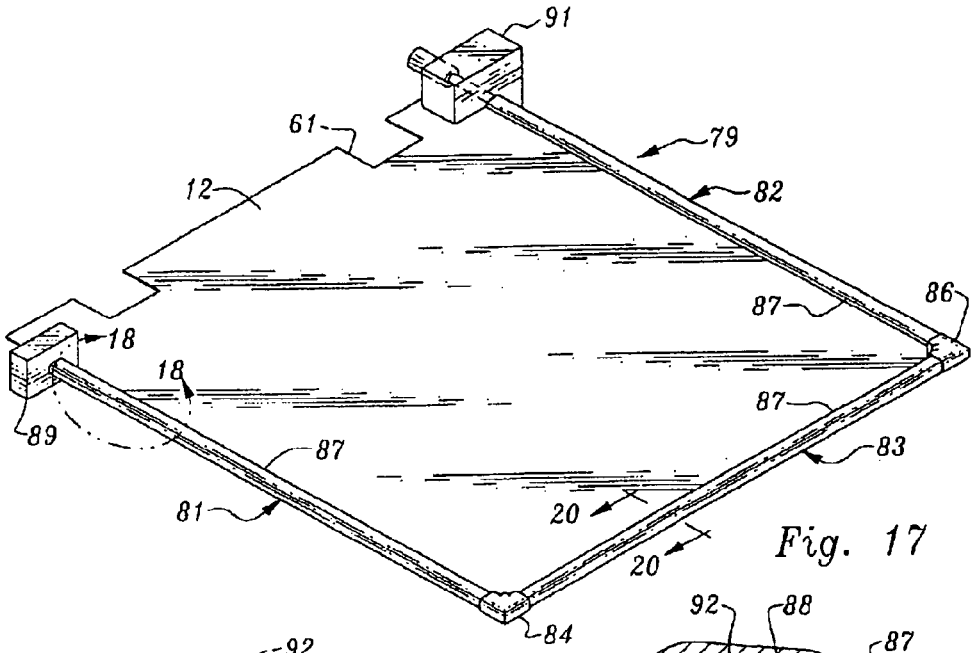
FIG. 17 is a perspective view of a cathode plate fitted with a third embodiment of an edge protector system, showing the injection mold forms on one top end and the dam on the other top end.
Figure 18:
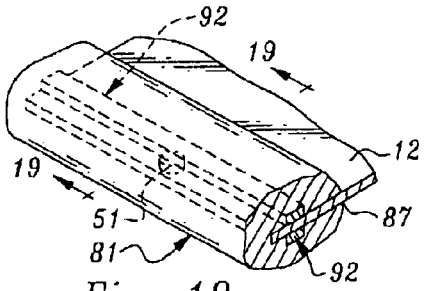
FIG. 18 is a fragmentary, cross-sectional, detail inset taken on the broken line 18-18 in FIG. 17, showing a molded locking body and the covered portion of the cathode plate in broken line.

Yet another embodiment of the invention, comprising an edge protector system 79 is shown in FIG. 17. This third embodiment is in many ways a combination of certain features of the first embodiment and the second embodiment, previously described. For that reason, where appropriate, many of the same numerical designations for various components will be used. In addition, where systems and assembly processes pertaining to these common components have already been discussed in detail, reference will simply be made to the previous discussion rather than repeating the same subject matter.

Edge protector system 79 includes a first side edge strip 81, a second side edge strip 82, and a bottom edge strip 83. These edge strips are assembled into a U-shaped unitary structure, by means of the same secondary molding process described in connection with the first embodiment, represented by edge protector system 11. Accordingly, edge protector 79 also includes a first molded corner piece 84 and a second molded corner piece 86. Side strips 81 and 82, as well as bottom edge strip 83, all include an inner, open side portion 87 and an inner cavity 88, identical to those corresponding features discussed previously.

Edge protector system 79 is slip-installed over the side edges and the bottom edge of cathode plate 12, as shown in FIG. 17. However, no retaining strips are installed along the side edges of the cathode plate, before the U-shaped unitary structure of system 79 is installed thereon. A dam 89 is provided at the upper end of the first side edge strip 81. An injection mold 91 is provided at the upper end of the second side strip 82. The entire assembly is held fast in a jig, or within clamps on an assembly table.

In a tertiary molding process, a fluid curable into a hardened form, is injected or introduced through the injection mold 91, into the remaining unfilled portion of inner cavity 88. This fluid is preferably a fluid plastic, identical or similar to that used previously to mold the edge strips and the corner pieces. As with the injection process described to make the edge protector system 62, the introduced fluid fills the portion of the inner cavity 88 above and below the side edge of the cathode plate and within the plurality of plate apertures. When this fluid cures into a hardened form, a locking body 92 is formed. This locking body permanently secures the edge strip assembly to the cathode plate.

Figure 19:
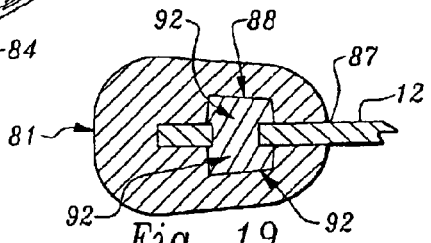
FIG. 19 is a cross-sectional view taken on the line 19-19 in FIG. 18.
Figure 20:
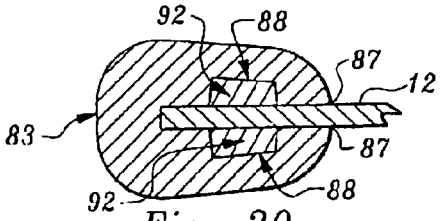
FIG. 20 is a cross-sectional view taken on the line 20-20 in FIG. 17.

FIG. 19, a cross-sectional view taken through a plate aperture 51, shows how the locking body 92 extends above, below, and through the side edge of the cathode plate 12. FIG. 20, a cross-sectional view taken through a representative portion of the bottom edge strip 83, shows how the locking body exists only above and below the bottom edge of the cathode plate 12. In other words, since no plate apertures are normally provided along the bottom edge, the locking body in this region is so confined.

Figure 21:
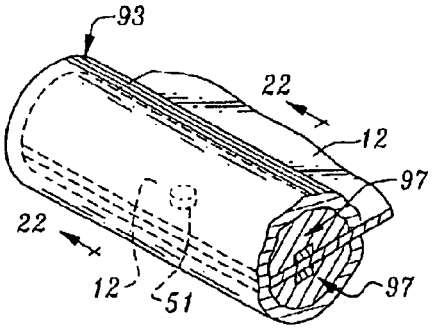
FIG. 21 is a fragmentary, cross-sectional detail inset of an alternative, tubular form of an edge protector strip, showing a molded locking body and the covered portion of the cathode plate in broken line; and, FIG. 22 is a cross-sectional view taken on the line 22-22 in FIG. 21.
Figure 22:
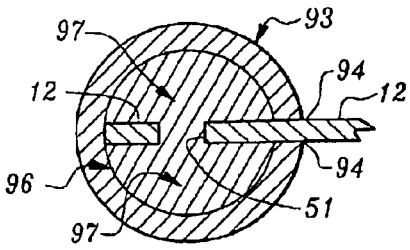

While all of the edge strips described so far have been generally rectangular in cross-section, other configurations may be used as well. For example, in FIGS. 21 and 22, an edge strip 93 which is circular in configuration is shown. Edge strip 93 has an inner, open side portion 94 which includes a right, circular cylindrical inner cavity 96. As with the other edge strips, the cathode plate 12 passes through the open side portion 94 and into the inner cavity 96. If the edge of the cathode plate includes a plate aperture 51, the locking body 97 will extend above, below, and through the edge of the plate, as shown in FIG. 22.

It will be appreciated, then, that I have disclosed three embodiments of improved cathode plate edge protector systems for cathode plates, and methods for making same, incorporating secondary and tertiary molding processes in conjunction with previously molded or extruded plastic edge protector strips. [of the cathode plate and within the plurality of plate apertures. When this fluid cures into a hardened form, a locking body 92 is formed. This locking body permanently secures the edge strip assembly to the cathode plate.]

[FIG. 19, a cross-sectional view taken through a plate aperture 51, shows how the locking body 92 extends above, below, and through the side edge of the cathode plate 12. FIG. 20, a cross-sectional view taken through a representative portion of the bottom edge strip 83, shows how the locking body exists only above and below the bottom edge of the cathode plate 12. In other words, since no plate apertures are normally provided along the bottom edge, the locking body in this region is so confined.]

[While all of the edge strips described so far have been generally rectangular in cross-section, other configurations may be used as well. For example, in FIGS. 21 and 22, an edge strip 93 which is circular in configuration is shown. Edge strip 93 has an inner, open side portion 94 which includes a right, circular cylindrical inner cavity 96. As with the other edge strips, the cathode plate 12 passes through the open side portion 94 and into the inner cavity 96. If the edge of the cathode plate includes a plate aperture 51, the locking body 97 will extend above, below, and through the edge of the plate, as shown in FIG. 22.]

[It will be appreciated, then, that I have disclosed three embodiments of improved cathode plate edge protector systems for cathode plates, and methods for making same, incorporating secondary and tertiary molding processes in conjunction with previously molded or extruded plastic edge protector strips.]

What is claimed is:

1. A U-shaped edge protector system for a cathode plate, comprising:

a. a first side edge strip and a second side edge strip, each of said side edge strips having an upper end and a lower end, and, an inner, open side portion extending therebetween, said lower end having a bevel termination;

b. a bottom edge strip having an first end with a bevel termination in mating engagement with said bevel termination of said first side edge strip forming a first juncture, and having a second end with a bevel termination in mating engagement with said bevel termination of said second side edge strip forming a second juncture, said bottom edge strip having an inner, open side portion extending between said first end and said second end;

c. a first molded corner piece, said first corner piece being molded over said first juncture; and, d. a second molded corner piece, said second corner piece being molded over said second juncture, forming a unitary structure.

2. An edge protector system as in claim 1 including a cathode plate, said cathode plate having a top edge, a bottom edge, and first and second side edges extending therebetween, said side edges including a plurality of plate apertures arranged in spaced relation, and further including first and second retainer strips, said retainer strips each including a plurality of registration pins depending from the underside thereof, said registration pins being arranged in spaced relation for insertion into said plate apertures, whereby said open side portions of said first edge strip and said second edge strip are respectively slip installed over said first retainer and said second retainer strip until said bottom edge of said cathode plate is inserted into said portion of said bottom edge strip.

3. An edge protector system as in claim 2 in which said cathode plate includes a hanger bar attached along said top edge, and further including a pair of hook holes extending through said cathode plate adjacent said top edge.

4. An edge protector system as in claim 2 in which said cathode plate is made from stainless steel.

5. An edge protector system as in claim 1 in which said first and second corner pieces are molded from liquid plastic.

[6. An edge protector system as in claim 1 in which said first and second corner pieces include a right-angle corner plug located at a terminus of said open side portion of said bottom edge strip.]

7. An edge protector system for a cathode plate, comprising:

a. a side edge strip having an open upper end and an open lower end, and an inner, open side portion extending therebetween, said open side portion including an inner cavity having a volume;

b. a cathode plate, said cathode plate having a top edge, a bottom edge, and a side edge extending therebetween said side edge including a plurality of plate apertures extending through said plate and arranged in spaced relation therealong, said side edge filling a portion of said volume of said inner cavity, and said open side portion enclosing said apertures; and, c. a locking body formed from a fluid curable into a hardened form, whereby said upper end of said side edge strip is temporarily fitted with a dam and said lower end of said side edge strip temporarily fitted with an injection mold fitting, and said locking body is injected in a fluid form through said injection mold fitting into the remaining unfilled portion of said volume and into said apertures, said fluid thereafter curing into a hardened form to secure said cathode plate and said side edge strip together.

8. An edge protector system as in claim 7 in which said locking body is made from an injection molded plastic.

9. An edge protector system as in claim 7 in which said inner cavity includes a plate recess sized and configured to receive said side edge of said cathode plate, and a strip recess having an upper portion and a lower portion in communication with said plate recess, said apertures in said cathode plate lying within said plate portion between said upper portion and said lower portion of said strip recess.

10. An edge protector system as in claim 7, in which said dam and said injection mold fitting are removed after said fluid is at least partially cured, and in which said locking body fills said open upper and lower ends of said side edge strip.

11. An edge protector [strip] *system* as in claim 7 in which said side edge strip is generally rectangular in transverse, cross-section.

12. An edge protector [strip] *system* as in claim 7 in which said side edge strip is circular in transverse, cross-section.

13. An edge protector system for a cathode plate, comprising:

a. a first side edge strip and a second side edge strip, each of said side edge strips having an upper end and a lower end, and an inner, open side portion extending therebetween, each of said open side portions including an inner cavity having a volume;

b. a cathode plate, said cathode plate having a top edge, a bottom edge, and first and second side edges extending therebetween, each of said first and second side edges including a plurality of plate apertures extending through said plate and arranged in spaced relation therealong, said first side edge filling a portion of said volume of said inner cavity of said first side edge strip, and said open side portion of said first side edge strip enclosing said apertures along said first side edge, said second side edge filling a portion of said volume of said inner cavity of said second side edge strip, and said open side portion of said second side edge strip enclosing said apertures along said second side edge and, c. a locking body formed from a fluid curable into a hardened form, said locking body being injected in a fluid form into the remaining unfilled portion of each of said volumes and into each of said apertures, said fluid thereafter curing into a hardened form to secure said cathode plate together with each of said first and said second side edge strips.

14. A U-shaped edge protector system for a cathode plate, comprising:

a. a cathode plate, said cathode plate having a top edge, a bottom edge, and first and second side edges extending therebetween, said side edges including a plurality of plate apertures arranged in spaced relation therealong;

b. a first side edge strip and a second side edge strip, each of said side edge strips having an upper end and a lower end, and an inner, open side portion extending therebetween, said open side portion including an inner cavity having a volume, and said lower end having a bevel termination, said first side edge of said cathode plate filling a portion of said volume of said inner cavity of said first side edge strip, and said open side portion of said first side edge strip enclosing said apertures along said first side edge, said second side edge of said cathode plate filling a portion of said volume of said inner cavity of said second side edge strip, and said open side portion of said second side edge strip enclosing said apertures along said second side edge;

c. a bottom edge strip having [an] *a* first end with a bevel termination in mating engagement with said bevel termination of said first side edge strip forming a first juncture, and having a second end with a bevel termination in mating engagement with said bevel termination of said second side edge strip forming a second juncture, said bottom edge strip having an inner, open side portion extending between said first end and said second end, said open side portion including an inner cavity having a volume, said bottom edge of said cathode plate filling a portion of said volume of said inner cavity of said bottom edge strip;

d. a first molded corner piece, said first corner piece being molded over said first juncture;

e. a second molded corner piece, said second corner piece being molded over said second juncture, forming a unitary structure; and, f. a locking body formed from a fluid curable into a hardened form, said locking body being injected in a fluid form into the remaining unfilled portion of each of said volumes and into each of said apertures, said fluid thereafter curing into a hardened form to secure said cathode plate together with each of said first and said second side edge strips and said bottom edge strip.

15. A method for making a U-shaped edge protector system for a cathode plate, comprising the steps of:

a. providing a first side edge strip and a second side edge strip, each of said side edge strips having an upper end and a lower end, and an inner, open side portion extending therebetween, said lower end having a bevel termination;

b. providing a bottom edge strip having [an] *a* first end with a bevel termination and a second end with a bevel termination;

c. maintaining said bevel termination of said first end of said bottom edge strip in mating engagement with said bevel termination of said first side edge strip, forming a first juncture;

d. molding a first corner piece over said first juncture;

e. maintaining said bevel termination of said second end of said bottom edge strip in mating engagement with said bevel termination of said second side edge strip, forming a second juncture; and, f. molding a second corner piece over said second juncture.

16. A method for making a cathode plate provided with an edge protector system, comprising the steps of:

a. providing a cathode plate, said cathode plate having a top edge, a bottom edge, and a side edge extending therebetween, said side edge including a plurality of plate apertures extending through said plate and arranged in spaced relation therealong, b. providing a side edge strip having an upper end and a lower end, and an inner, open side portion extending therebetween, said open side portion including an inner cavity having a volume;

c. inserting said side edge of said cathode plate into said open side portion, filling a portion of said volume of said inner cavity and enclosing said apertures within said open side portion;

d. forming a locking body from a fluid curable into a hardened form, by injecting said fluid into the remaining unfilled portion of said volume and into said apertures; and, e. allowing said fluid to cure into a hardened form, thereby securing said cathode plate and said side edge strip together.

*17. A U-shaped edge protector system for a cathode plate, comprising:*

*a. a first side edge stip and a second side edge strip, each of said side edge strips having an upper end and a lower end, and an inner, open side portion extending therebetween, said lower end having a bevel termination;*

*b. a bottom edge strip having a first end with a bevel termination in mating engagement with said bevel termination of said first side edge strip forming a first juncture, such that said bevel termination of said first side edge strip and said bevel termination of said bottom edge strip are in parallel relation, and having a second end with a bevel termination in mating engagement with said bevel termination of said second side edge strip forming a second juncture, such that said bevel termination of said second side edge strip and said bevel termination of said bottom edge strip are in parallel relation, said bottom edge strip having an inner, open side portion extending between said first end and said second end;*

*c. a first molded corner piece, said first corner piece being molded over said first juncture; and,*

*d. a second molded corner piece, said second corner piece being molded over said second juncture, forming a unitary structure.*

*18. An edge protector system as in claim 17, including a cathode plate, said cathode plate having a top edge, a bottom edge, and first and second side edges extending therebetween, said side edges including a plurality of plate apertures arranged in spaced relation, and further including first and second retainer strips, said retainer strips each including a plurality of registration pins depending from the underside thereof, said registration pins being arranged in spaced relation for insertion into said plate apertures, whereby said open side portions of said first edge strip and said second edge strip are respectively slip installed over said first retainer strip and said second retainer strip until said bottom edge of said cathode plate is inserted into said open side portion of said bottom edge strip.*

*19. An edge protector system as in claim 18, in which said cathode plate includes a hanger bar attached along said top edge, and further including a pair of hook holes extending through said cathode plate adjacent said top edge.*

*20. An edge protector system as in claim 18, in which said cathode plate is made from stainless steel.*

*21. An edge protector system as in claim 17 in which said first and second corner pieces are molded from liquid plastic.*

* * * * *